US009670816B2

(12) United States Patent
Quan et al.

(10) Patent No.: US 9,670,816 B2
(45) Date of Patent: Jun. 6, 2017

(54) EXHAUST GAS AFTERTREATMENT DEVICE FOR A COMBUSTION ENGINE

(71) Applicant: Daimler AG, Stuttgart (DE)

(72) Inventors: Peng Quan, Novi, MI (US); Jeffrey Girbach, Farmington, MI (US); Daniel Hudson, Royal Oak, MI (US); Inderpal Singh, Livonia, MI (US)

(73) Assignee: Daimler AG, Stuttgart (DE)

( * ) Notice: Subject to any disclaimer, the term of this patent is extended or adjusted under 35 U.S.C. 154(b) by 472 days.

(21) Appl. No.: 14/134,788

(22) Filed: Dec. 19, 2013

(65) Prior Publication Data

US 2014/0178261 A1   Jun. 26, 2014

(30) Foreign Application Priority Data

Dec. 20, 2012   (GB) .................................. 1223119.7

(51) Int. Cl.
*F01N 3/28*   (2006.01)
*F01N 3/20*   (2006.01)
(Continued)

(52) U.S. Cl.
CPC ........ *F01N 3/2892* (2013.01); *B01F 3/04049* (2013.01); *B01F 5/0451* (2013.01);
(Continued)

(58) Field of Classification Search
None
See application file for complete search history.

(56) References Cited

U.S. PATENT DOCUMENTS

| 6,401,455 B1 | 6/2002 | Mathes et al. |
| 2007/0101703 A1* | 5/2007 | Kanaya .............. B01D 53/9431 60/286 |

(Continued)

FOREIGN PATENT DOCUMENTS

| DE | 197 31 865 A1 | 2/1999 |
| JP | 2005155404 A * | 6/2005 |

(Continued)

OTHER PUBLICATIONS

Nishiyama, T. JP2005-155404A—translated document (2005).*

*Primary Examiner* — Walter D Griffin
*Assistant Examiner* — Jelitza Perez
(74) *Attorney, Agent, or Firm* — Crowell & Moring LLP

(57) ABSTRACT

An exhaust gas aftertreatment device for a combustion engine includes an exhaust gas guide element that includes a dosage device for introducing a reduction agent into the guide element at a feed point and at least one interference element arranged upstream of the feed point, that introduces turbulences into the exhaust gas flow that is intermixed with the reduction agent. The guide element also includes a first guide portion, through which exhaust gas flows in a first flow direction, and a second guide portion, through which exhaust gas flows in a second flow direction that is opposite to the first flow direction. The first and second guide portions are fluidically connected with each other via a third guide portion, which redirects the exhaust gas from the first flow direction into the second flow direction. The feed point and the interference element are arranged in the third guide portion.

10 Claims, 3 Drawing Sheets

Figure 1:
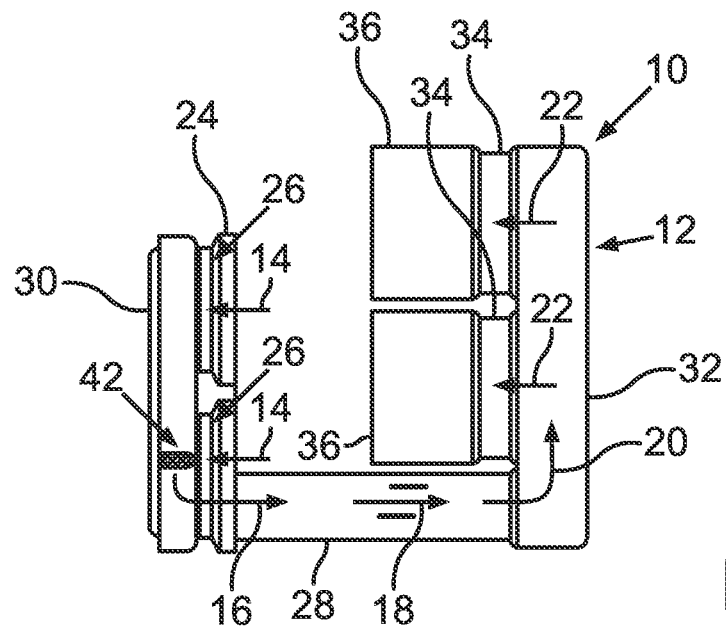

(51) Int. Cl.
    *B01F 5/04*          (2006.01)
    *B01F 5/06*          (2006.01)
    *B01F 3/04*          (2006.01)
    *B01F 5/00*          (2006.01)

(52) U.S. Cl.
    CPC .......... *B01F 5/0648* (2013.01); *F01N 3/2066* (2013.01); *B01F 2005/0025* (2013.01); *F01N 2240/20* (2013.01); *Y02T 10/24* (2013.01)

(56) References Cited

U.S. PATENT DOCUMENTS

2011/0099978 A1    5/2011    Davidson et al.
2011/0167810 A1*    7/2011    Lebas ................ B01F 3/04049
                                                               60/324

FOREIGN PATENT DOCUMENTS

WO    WO 2012/008570 A1    1/2012
WO    WO 2013/004769 A1    1/2013

* cited by examiner

EXHAUST GAS AFTERTREATMENT DEVICE FOR A COMBUSTION ENGINE

CROSS-REFERENCE TO RELATED APPLICATIONS

The present application claims priority under 35 U.S.C. §119 to United Kingdom Patent Application No. 1223119.7, filed Dec. 20, 2012, the entire disclosure of which is herein expressly incorporated by reference.

BACKGROUND AND SUMMARY OF THE INVENTION

Exemplary embodiments of the present invention relate to an exhaust gas aftertreatment device for a combustion engine, in particular of a motor vehicle.

German patent document DE 197 31 865 A1 discloses an exhaust gas aftertreatment devices for a combustion engine, in particular of a motor vehicle. The exhaust gas aftertreatment device referred to therein as exhaust gas purification facility comprises a guide element in the form of an exhaust gas tube, through which exhaust gas can flow, as well as a dosage device. Using the dosage device a reduction agent for aftertreatment of exhaust gas can be introduced into the guide element at least at one feed point. This means that in the course of the exhaust gas aftertreatment the reduction agent is supplied to the exhaust gas flowing through the guide element.

The exhaust gas aftertreatment device also comprises at least one interference element, which is arranged upstream of the feed point within the guide element. The exhaust gas flows towards the interference element, which—for supporting an intermixing of the exhaust gas with the reduction agent—causes turbulences in the flow of the exhaust gas. The interference element thus is employed as mixing device so that the exhaust gas, due to the turbulences caused in its flow, intermixes with the reduction agent.

The reduction agent commonly is urea, which is present in an aqueous urea solution. The reduction agent usually is stored in a tank of the motor vehicle and carried along in the tank.

The exhaust gas and the reduction agent contained in the exhaust gas commonly flow to an SCR catalytic converter (SCR—selective catalytic reduction), by means of which a reaction of the exhaust gas, and in particular of the nitrogen oxides ($NO_x$), with the ammoniac ($NH_3$) contained in the reduction agent is caused. In the course of this reaction the ammoniac reacts with the nitrogen oxides to produce water and nitrogen. The reduction agent thus is used for the so-called denitriding of the exhaust gas.

A good intermixing of the reduction agent with the exhaust gas has an advantageous effect upon the described reaction. This means that for denitriding the exhaust gas only a very small amount of reduction agent needs to be supplied to the exhaust gas, if a good intermixing of the exhaust gas with the reduction agent is realized. If only a very poor intermixing is realized, a correspondingly larger amount of reduction agent needs to be supplied to the exhaust gas. This leads to a correspondingly fast exhaustion of the tank. In order to nevertheless realize particularly long periods between two filling operations of the tank, the tank can be equipped with a correspondingly large intake capacity. This, however, requires a very large quantity of reduction agent and thus requires a large weight increase of the motor vehicle.

Exemplary embodiments of the present invention are directed to an exhaust gas aftertreatment device providing a particularly good intermixing of the gas with the reduction agent.

In order to further develop an exhaust gas aftertreatment device for a combustion engine, in particular of a motor vehicle, in such a way that a particularly good intermixing of the exhaust gas with the reduction agent is realizable, it is envisaged according to the present invention that the guide element comprises at least one first guide portion, through which the exhaust gas can flow in a first flow direction, and at least one second guide portion, through which the exhaust gas can flow in a second flow direction that is contrary to the first flow direction. In other words, during operation of the combustion engine the exhaust gas flows through the first guide portion in the first flow direction, whilst the exhaust gas flows through the second guide portion in the second flow direction that is contrary to the first flow direction. The second flow direction thus relative to the first flow direction is a counter direction.

The guide element further comprises a third guide portion, which redirects the exhaust gas from the first flow direction into the second flow direction and via which the first guide portion and the second guide portion are fluidically connected with each other. This means that the exhaust gas initially flowing through the first guide portion flows from the first guide portion into the third guide portion and is redirected by means of the third guide portion. Finally, the exhaust gas flows from the third guide portion into the second guide portion.

The feed point and the interference element in this setup are arranged within the third guide portion, wherein the interference element has at least one flow through opening for the exhaust gas. The interference element thus is a perforated baffle, towards and through which the exhaust gas can flow and which causes turbulences in the flow of the exhaust gas.

By virtue of this design of the exhaust gas aftertreatment device particularly advantageous turbulences of the flow of the exhaust gas are caused so that the exhaust gas intermixes very well with the reduction agent. Firstly, the turbulence introduced by the interference element will enhance intermixing between exhaust gas and reduction agent. More importantly, the interference element changes the flow field in the third guide portion, which allow intermixing take place further upstream (in the third guide portion) than the case without the interference element. In addition, the early section of the second guide portion is also better utilized for intermixing since stronger swirl is formed there due to the changed flow field by the interference element in the third guide portion. All these factors contribute significantly to achieving even reduction agent distribution at SCR catalyst. As a consequence, when denitriding the exhaust gas even with a very small amount of reduction agent, particularly high conversion rates can be realized. Accordingly, a tank for storing and transporting the reduction agent can have a particular small intake capacity. Nevertheless, large time intervals between the two maintenance instants, at which the tank is filled with reduction agent, are realizable.

Moreover, the exhaust gas aftertreatment device due to guiding of the exhaust gas in the two contrary flow directions requires only very little construction space so that packaging problems can be solved and/or avoided. Moreover, the interference element can be configured to have a particularly low complexity, i.e. a particularly simple design with regard to its structure, so that the exhaust gas aftertreatment device involves only very small costs.

For realizing a particularly advantageous intermixing in one embodiment of the invention the interference element has a plurality of flow through openings for the exhaust gas.

It has turned out to be further particularly advantageous if the interference element, at least in one partial area, is designed as surface element extending at least essentially perpendicularly to the flow direction of the exhaust gas in the third guide portion. The interference element thus, at least in one partial area, has a particularly simple structure and can be produced at low cost.

If the flow through openings are arranged in the partial area, turbulences of the flow of the exhaust gas that are very advantageous for the intermixing can be caused. Moreover, the flow through openings can be provided in a simple and cost-efficient way in the partial area.

In a further advantageous design of the invention the interference element has a flange extending at least essentially at an angle or perpendicularly to the partial area, via which flange the interference element is connected to the third guide portion. This allows a simple mounting of the interference element on the third guide portion. The interference element may be screwed and/or glued and/or welded together with the third guide portion or connected in any other way with it.

In a further embodiment of the invention the third guide portion has a flow cross-section through which the exhaust gas can flow. The flow cross-section comprises a first partial area and a second partial area. The interference element in this connection is arranged in the first partial area and the exhaust gas can flow around it via the second partial area. In other words, the exhaust gas flowing through the third guide portion flows towards the interference element in the first partial area, with the interference element not being arranged in the second partial area. Accordingly, in the second partial area the exhaust gas does not flow towards the interference element. The second partial area thus is free of the interference element.

In this connection the second partial area, in which the interference element is not arranged, can be larger than the first partial area. Accordingly, an increase of the exhaust gas counter pressure caused by the interference element can be avoided or at least be kept to a minimum. This advantageously affects charge changes of the combustion engine, which is for instance configured as internal combustion reciprocating piston engine, and leads to an efficient operation at low fuel consumption. At the same time, by means of the interference element a very good intermixing of the exhaust gas with the reduction agent is realizable so that local accumulations of the reduction agent in the exhaust gas can be avoided.

In a further advantageous embodiment of the invention the interference element has at least one side that, in one area of a wall of the third guide portion, contacts the wall and is adapted in its outer contour to the area of the wall. Thereby, a defined guiding of the exhaust gas can be realized, since it cannot flow through between the partial area of the wall and the interference element.

Further advantages, features, and details of the invention derive from the following description of preferred embodiments as well as from the drawings. The features and feature combinations previously mentioned in the description and the features and feature combinations mentioned in the following description of the figures and/or shown in the figures alone can be used not only in the respective indicated combination, but also in any other combination or taken alone, without leaving the scope of the present invention.

BRIEF DESCRIPTION OF THE DRAWING FIGURES

Figure 2:
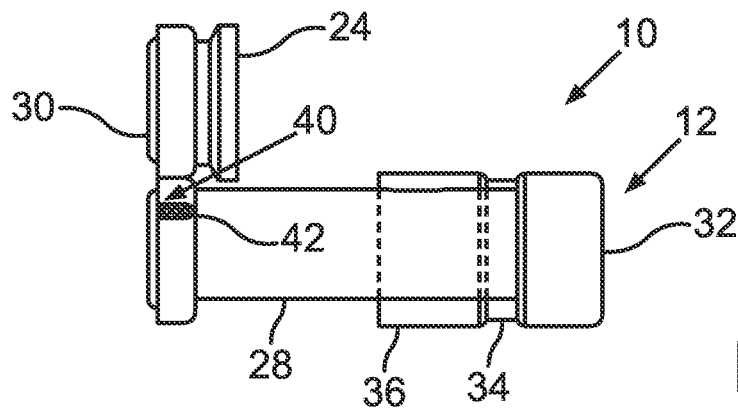
Figure 3:
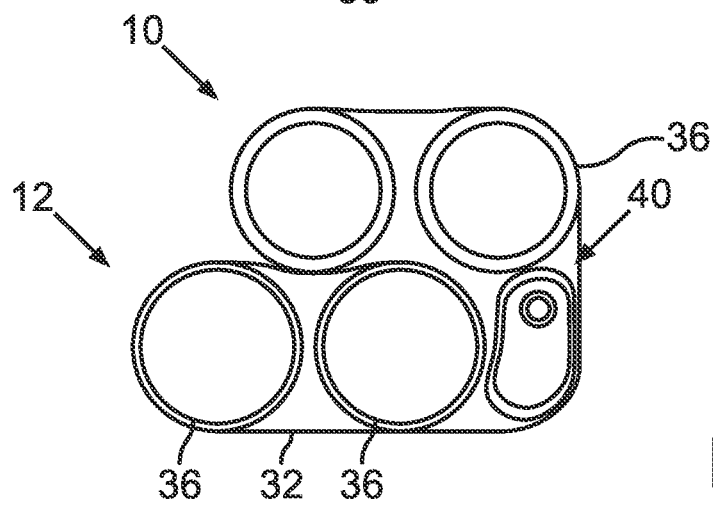
Figure 4:
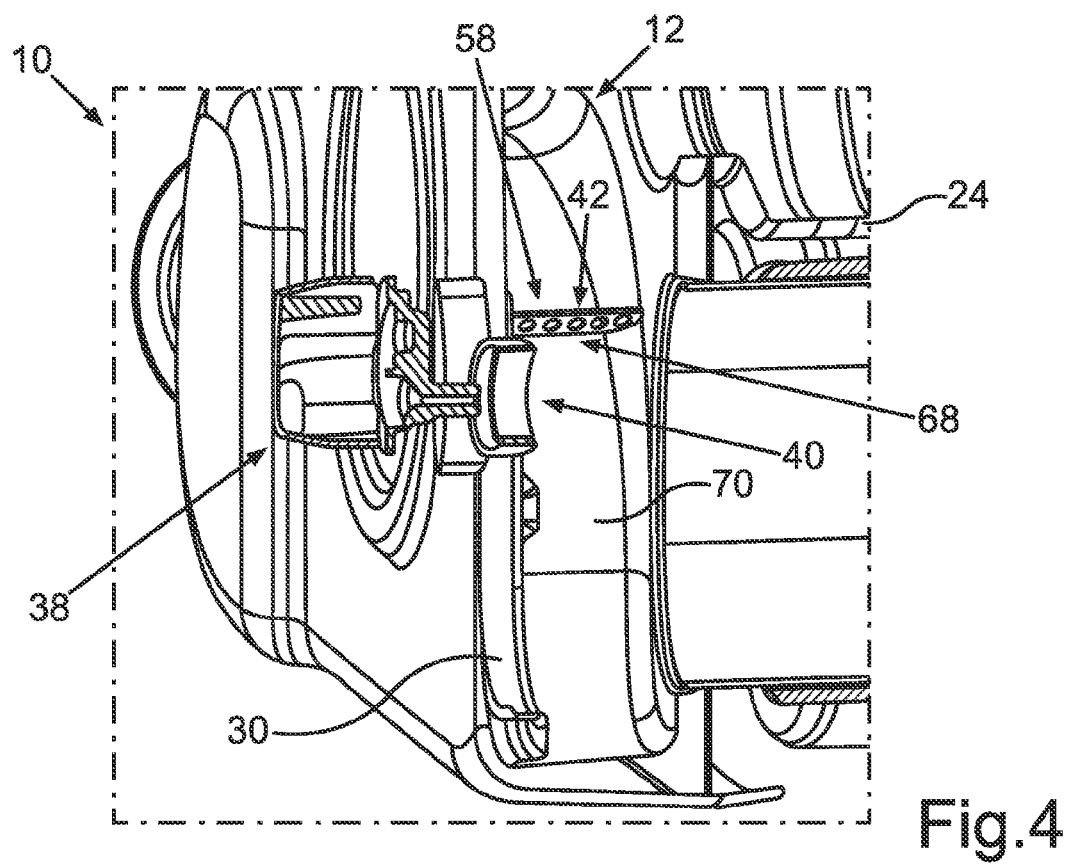
Figure 5:
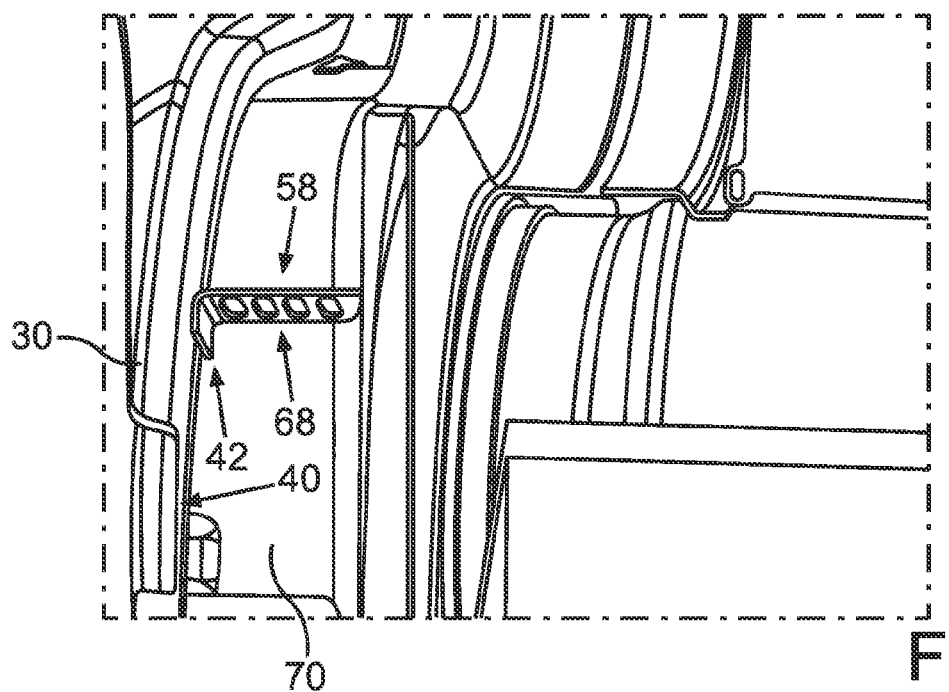
Figure 6:
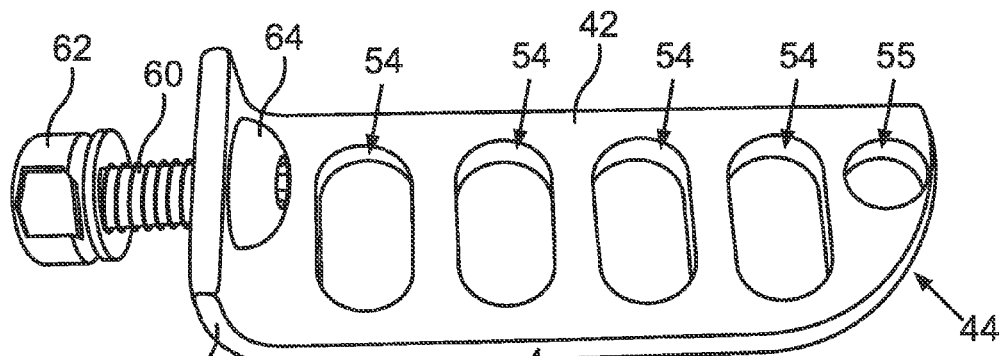
Figure 7:
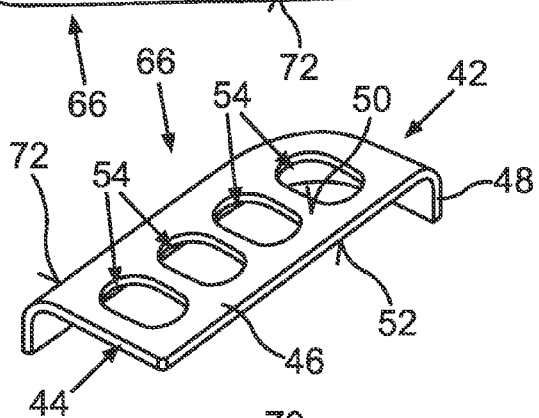
Figure 8:
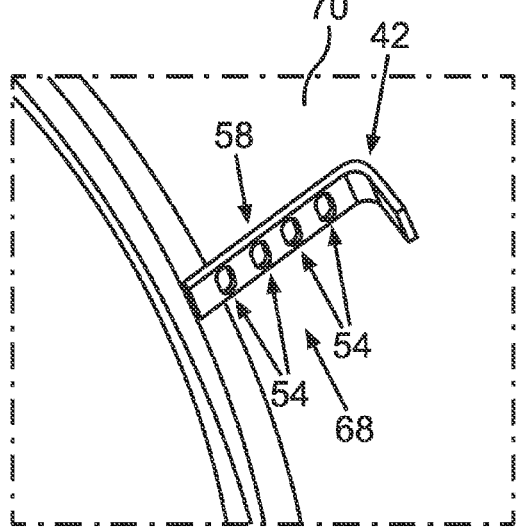

The drawing shows in:

FIG. 1 a schematic top view of an exhaust gas aftertreatment device for a combustion engine of a motor vehicle, comprising two guide portions, through which exhaust gas of the combustion engine can flow in respectively opposite flow directions and which are fluidically connected with each other via a third guide portion of the guide element, wherein in the third guide portion a feed point, at which a reduction agent for exhaust gas aftertreatment is introducible, as well as an interference element arranged upstream of the feed point for causing turbulences in the flow of the exhaust gas is provided;

FIG. 2 a schematic lateral view of the exhaust gas aftertreatment device;

FIG. 3 a schematic front view of the exhaust gas aftertreatment device;

FIG. 4 part of a schematic and sectional perspective view of the exhaust gas aftertreatment device;

FIG. 5 part of a further schematic and sectional perspective view of the exhaust gas device;

FIG. 6 a schematic perspective view of the interference element;

FIG. 7 part of a schematic perspective view of a further embodiment of the interference element; and FIG. 8 part of a schematic and sectional perspective view of the exhaust gas aftertreatment device with the interference element according to FIG. 7.

In the figures same elements or elements having same functions are equipped with same reference signs.

DETAILED DESCRIPTION

FIG. 1 shows a schematic top view of an exhaust gas aftertreatment device 10 for a combustion engine, configured as internal combustion reciprocating piston engine, of a utility motor vehicle. The exhaust gas aftertreatment device 10 comprises a guide element in the form of an exhaust gas aftertreatment box 12. The exhaust gas aftertreatment box 12 is an at least essentially box-like container for guiding exhaust gas of the combustion engine.

For this purpose the exhaust gas aftertreatment box 12 (guide element) is arranged within an exhaust tract of the combustion engine and is fluidically connected to the exhaust gas tubing. The exhaust gas of the combustion engine can flow through the exhaust gas tubing. By means of the exhaust gas tubing the exhaust gas leaving the combustions spaces in the form of cylinders is fed to the exhaust gas aftertreatment box 12 so that the exhaust gas can flow from the exhaust gas tubing into the exhaust gas aftertreatment box 12 and can flow through it—as indicated in FIG. 1 by direction arrows 14, 16, 18, 20, 22.

The exhaust gas aftertreatment box 12 comprises two first guide portions 24 bounding respective exhaust gas guide ducts 26. The exhaust gas guide ducts 26 are at least in portions fluidically separate from each other, and the exhaust gas can flow through them in the first flow direction, which is indicated by direction arrows 14. In other words the exhaust gas during a fired operation of the combustion engine flows through the exhaust gas guide ducts 26 in the first flow direction.

By the first guide portions 24 respective connection elements are formed, by means of which the first guide portions 24 each are fluidically connectable with a particle filter. The particle filter (not shown in FIG. 1) with regard to the flow of the exhaust gas through the particle filter and through the first guide portions 24 are arranged in parallel to each other.

Accordingly, the guide elements 24 are arranged in parallel to each other.

The combustion engine for instance is a diesel engine, which can be operated on liquid fuel in the form of diesel. The particle filters, which accordingly are also referred to as diesel particle filters (DPF), in this connection serve for partially filtering particles contained in the exhaust gas out from the exhaust gas. For this purpose the exhaust gas can flow through the particle filters. The exhaust gas flowing through each of the particle filters during fired operation of the combustion engine flows from the particle filters into the respective first guide portions 24.

The exhaust gas aftertreatment box 12 also comprises a second guide element 28, through which the exhaust gas of the combustion engine can flow in a second direction that is illustrated by the direction arrow 18. The second flow direction in this connection is opposite to the first flow direction. In other words the exhaust gas during fired operation of the combustion engine flows through the first guide portions 24 in the first flow direction and through the second guide portion 28 in the second flow direction that is contrary to the first flow direction.

Moreover, the exhaust gas aftertreatment box 12 comprises a third guide portion in the form of a first collection chamber 30. The first collection chamber 30 is fluidically connected both with the first guide portions 24 as well as with the second guide portion 28 so that the guide portions 24, 28 are fluidically connected with each other via the first collection chamber 30. In this setup the exhaust gas flowing from the first guide portions 24 into the collection chamber 30 is collected in the collection chamber 30 and by means of the collection chamber 30—as is indicated by the direction arrow 16 in FIG. 1—is redirected from the first flow direction indicated by direction arrows 14 into the second flow direction indicated by direction arrow 18. Thereby, a particularly small construction space requirement of the exhaust gas aftertreatment device 10 is realized.

The guide element 28, which is on the one side fluidically connected with the first collection chamber 30, on the other side is fluidically connected with a fourth guide portion in the form of a second collection chamber 32 of the exhaust gas aftertreatment box 12 so that the exhaust gas flowing towards the second guide portion 28 flows from the latter into the second collection chamber 32. The exhaust gas aftertreatment box 12 moreover comprises two fifth guide portions 34, which are fluidically connected to the second collection chamber 32. The fifth guide portions 34 bound respective exhaust gas guide ducts, through which the exhaust gas can flow. In other words, the exhaust gas, which flows into the collection chamber 32 and is collected by same, flows from the second collection chamber 32 into the exhaust gas guide ducts and thus into the fifth guide portions 34 and flows through the fifth guide portions 34 into a third flow direction, which is indicated by the direction arrows 22. As illustrated by the direction arrows 14, 22, the third flow direction corresponds to the first flow direction.

By the second collection chamber 32 thus a further redirection of the exhaust gas from the second flow direction back into the first flow direction, as indicated by the direction arrow 20, is caused.

The exhaust gas guide ducts of the respective fifth guide portions 34 are at least in portions separate from each other. By the fifth guide portions 34 a respective connection element is formed, by means of which the fifth guide portions 34 are fluidically connected with a respective SCR catalytic converter 36 (SCR—selective catalytic reduction). This means that the exhaust gas flowing through the fifth guide portions 34 can flow into the SCR catalytic converters 36 and can flow through same. The SCR catalytic converters 36 serve for denitriding the exhaust gas. This means that the SCR catalytic converters 36 are used for at least reducing nitrogen oxides ($NO_x$) contained in the exhaust gas.

As can be seen in a combined view with FIGS. 2 and 3, the first guide portions 24 and the fifth guide portions 34 are arranged at different levels of height, i.e. in planes that are spaced apart from each other. With reference to the mounted state of the exhaust gas aftertreatment device 10 on the utility motor vehicle the fifth guide portions 34 for instance in the vertical direction of the vehicle are arranged below the first guide portions 24, i.e. at a lower level than these. The exhaust gas in this setup is guided by means of the first collection chamber 30 also in the vertical direction of the vehicle downwards to the second guide portion 28, which is arranged below the first guide portions 24.

For denitriding the exhaust gas the exhaust gas aftertreatment device 10—as can be seen in particular in a combined view with FIGS. 4 and 5—comprises a dosage device 38. The dosage device 38 serves for introducing a reduction agent for the aftertreatment of the exhaust gas, i.e. for denitriding the exhaust gas, at a feed point 40 into the first collection chamber 30. This means that the reduction means is fed into the exhaust gas at the feed point 40 by means of the dosage device 38.

The reduction means in this process is present in the form of an aqueous urea solution. The ammoniac ($NH_3$) contained in the aqueous urea solution, which reacts in the respective SCR catalytic converter 36 with the nitrogen oxides in the exhaust gas to produce water and nitrogen, is used for denitriding the exhaust gas. This reaction in this process is caused by the SCR catalytic converters 36.

The aqueous urea solution is stored in a tank (not shown in FIGS. 1 to 8) of the utility motor vehicle, wherein the tank is fluidically connected with the dosage device 38. In order to denitride the exhaust gas efficiently with an only very small amount of reduction agent, a very good intermixing of the exhaust gas with the reduction means is advantageous.

For realizing this very good intermixing the exhaust gas aftertreatment device 10 comprises an interference element 42, which can be seen particularly well from FIGS. 4 to 6 and which relative to the flow direction of the exhaust gas is arranged through the first collection chamber 30 upstream the feed point 40 in the first collection chamber 30. The interference element 42 introduces extra turbulence for intermixing enhancement. It also changes the flow field downstream to produce early intermixing than the case without it. Moreover, the intermixing in the second guide portion 28 is improved due to the changed flow field as well. Therefore, essentially homogenous mixture of exhaust gas and reduction agent can be produced when the mixture reaches SCR catalyst 36.

The interference element 42 is provided in a partial area 44 and is designed as surface element 46, which in the state in which it is arranged in the first collection chamber 30, extends at least essentially perpendicularly to the flow direction of the exhaust gas. The surface element 46 therein is at least essentially designed to be plate-like and on respective wide sides 50, 52 (FIG. 7) is of an at least essentially even design. In the partial area 44 the interference element 42 has a plurality of flow through openings 54, 55 for the exhaust gas. The exhaust gas can flow through the flow through openings 54, 55 so that the exhaust gas can flow towards the interference element 42, in particular its partial area 44, and via the flow through openings 54, 55 can flow through it. The flow through openings 54 in this connection with regard to its shape and its surface are at least essentially of the same design. While the flow through openings 54 are configured as oblong holes, the flow through opening 55 is of a circular design. The sum of the surfaces of the flow through openings 54, 55 through which the exhaust gas can flow, in this connection can be larger than the sum of the surfaces of the partial area 44, through which the exhaust gas cannot flow.

The interference element 42 also has a flange 48, which in the present case extends at least essentially perpendicularly to the partial area 44, which is connected to the partial area 44 and in the present case is formed as a single piece. According to FIGS. 4 and 5 the flange 48 is used for screwing the interference element 42 together with the first collection chamber 30. For this purpose a screw 60 with an external thread and a nut 62 with an internal thread corresponding to the external thread are provided. The screw 60 penetrates a corresponding flow through opening of the flange 48 and is supported with a screw head 64 on the flange 48. Hereby a particularly simple, time and cost-efficient mounting of the interference element 42 is realizable. In the present case the interference element 42 is formed from a metallic material.

In the case of the exhaust gas aftertreatment device according to FIG. 8 a further embodiment of the interference element 42, which can be discerned from FIG. 7, is used. Herein the interference element 42 is connected in such a way with the first collection chamber 30 that the interference element 42 via the flange 48 is for instance welded and/or glued together with the first collection chamber 30.

As can be seen in particular from FIGS. 4 and 5, the interference element 42 is arranged in a first partial area 58 of a flow cross-section, through which the exhaust gas can flow. The flow cross-section also has a second partial area, wherein the flow cross-section is formed by the first partial area and the second partial area. The interference element 42 in this connection is merely arranged in the first partial area of the flow cross-section. This means that the interference element 42 is not arranged in the second partial area. Accordingly, the exhaust gas flowing through the flow cross-section in the first partial area can flow towards the interference element 42, flow through same and bypass the interference element 42 via the second partial area so that the exhaust gas flowing through the second partial area does not flow towards or through the interference element 42. The second partial area therein is larger than the first partial area of the flow cross-section.

This means that a major part of the exhaust gas, i.e. more than half of the exhaust gas flowing through the first collection chamber 30 passes around the interference element 42, without flowing towards it or through it. Thereby, an increase of the exhaust gas counter pressure for the combustion engine caused by employing the interference element 42 can be kept at least small, while at the same time achieving a very good intermixing of the exhaust gas with the reduction agent. As can be seen from FIG. 6, the interference element 42 moreover has a very simple setup so that it can be manufactured in a time and cost efficient way.

The interference elements 42 according to FIGS. 6 to 8 each have a side 66, which in the state, in which they are connected with the first collection chamber 30, in an area 68 of the wall 70 of the first collection chamber 30 contact the wall 70. The side 66 of the interference element 42 according to FIGS. 6 and 7 in this configuration is formed by the flange 48. In this connection the side 66 in its outer contour 72 is adapted to the area 68 of the wall 70. In other words, the wall 70 in the area 68 has a contour, wherein the outer contour 72 is configured as counter contour corresponding to the contour.

In this way the interference element 42 via its side 66 can at least essentially seamlessly contact the wall 70 so that no undesired flows of the exhaust gas passing through between the wall 70 and the interference element 42 occur.

The interference element 42 is configured as a perforated baffle, deflector plate or impact baffle, which leads to a particularly good intermixing. Thus, undesired local accumulations of the reduction agent within the exhaust gas can be avoided. By means of the interference element 42 and its arrangement it is also possible to realize a mixing zone, in which an intermixing of the exhaust gas with the reduction agent occurs, already upstream and at the beginning of the second guide portion 28, wherein a particularly advantageous intermixing occurs by means of the second guide portion 28. As a consequence, the second guide portion 28 is also referred to as mixing tube. This results in a particularly good intermixing prior to the exhaust gas with the reduction agent finally flowing into the SCR catalytic converter 36.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust gas aftertreatment device for a combustion engine, the exhaust gas aftertreatment device comprising:
   a guide element configured to receive exhaust gas of the combustion engine, wherein the guide element comprises
      at least one first guide portion configured to receive the exhaust gas in a first flow direction; and
      at least one second guide portion configured to pass the exhaust gas can flow in a second flow direction that is contrary to the first flow direction;
   a third guide portion fluidically connecting the first guide portion to the second guide portion and configured to redirect the exhaust gas from the first flow direction into the second flow direction, wherein the third guide portion has a flow cross-section through which the exhaust gas can flow, the flow cross-section being formed by a first partial area and a second partial area being larger than the first partial area, wherein the first partial area is closer positionally to the at least one second guide portion than to the at least one first guide portion;
   a dosage device configured to feed a reduction agent for the exhaust gas aftertreatment at least at one feed point arranged in the third guide portion; and
   at least one interference element arranged in the first partial area of the cross-section of the third guide portion upstream of the feed point and having a plurality of flow through openings for the exhaust gas, wherein the interference element is configured to introduce a turbulence into the exhaust gas flow that is intermixed with the reduction agent, wherein a sum of surfaces of the flow through openings of the interference element is larger than the sum of remaining surface of the interference element, and wherein the at least one interference element has approximately a flat surface and the flat surface is arranged laterally in the third guide portion.

2. The exhaust gas aftertreatment device according to claim 1, wherein the interference element is a perforated baffle.

3. The exhaust gas aftertreatment device according to claim 1, wherein the flat surface extends at least essentially perpendicularly to the flow direction of the exhaust gas in the third guide portion.

4. The exhaust gas aftertreatment device according to claim 3, wherein the flow through openings are arranged in the flat surface.

5. The exhaust gas aftertreatment device according to claim 3, wherein the interference element has at least one flange extending at an angle or perpendicularly to the flat surface, via which the interference element is connected to the third guide portion.

6. The exhaust gas aftertreatment device according to claim 3, wherein the interference element has at least one side contacting a wall of the third guide portion in an area of the wall, the at least one side having outer contour adapted to the area of the wall.

7. The exhaust gas aftertreatment device according to claim 1, further comprising:
at least one particle filter; and
at least one selective catalytic reduction (SCR) catalytic converter.

8. The exhaust gas aftertreatment device according to claim 7, wherein during operation of the combustion engine, exhaust gas of the combustion engine flows through the at least one particle filter in the first flow direction.

9. The exhaust gas aftertreatment device according to claim 7, wherein during operation of the combustion engine, exhaust gas of the combustion engine flows through the at least one SCR catalytic converter in the second flow direction.

10. An exhaust gas aftertreatment device for a combustion engine, the exhaust gas aftertreatment device comprising:
a guide element configured to receive exhaust gas of the combustion engine, the guide element comprising
a dosage device, arranged at least at one feed point, configured to feed a reduction agent for the exhaust gas aftertreatment into the guide element;
at least one interference element arranged upstream of the feed point in the guide element, wherein the at least one interface element is configured to generate turbulence in the flow the exhaust gas that is intermixed with the reduction agent;
at least one first guide portion configured to recieve the exhaust gas in a first flow direction;
at least one second guide portion configured to pass the exhaust gas in a second flow direction that is contrary to the first flow direction;
wherein the at least one first guide portion and the at least one second guide portion are fluidically connected with each other via a third guide portion of the guide element, wherein the third guide portion redirects the exhaust gas from the first flow direction into the second flow direction, wherein the third guide portion has a flow cross-section through which the exhaust gas can flow, the flow cross-section being formed by a first partial area and a second partial area being larger that the first partial area, wherein the first partial area is closer positionally to the at least one second guide portion than to the at least one first guide portion, wherein the feed point and the interference element have at least one flow through opening for the exhaust gas are arranged in the third guide portion, and wherein the at least one interference element has approximately a flat surface and the flat surface is arranged laterally in the third guide portion, and
wherein at least one particle filter and at least one selective catalytic reduction (SCR) catalytic converter are arranged in the aftertreatment device, wherein during operation of the combustion engine the at least one particle filter is flown through by exhaust gas of the combustion engine in the first flow direction, and the at least one SCR catalytic converter is flown through by exhaust gas of the combustion engine in the second flow direction.

* * * * *